(12) United States Patent
Roberts et al.

(10) Patent No.: US 7,984,498 B2
(45) Date of Patent: *Jul. 19, 2011

(54) METHODS AND APPARATUSES FOR SELECTING PRIVILEGES FOR USE DURING A DATA COLLABORATION SESSION

(76) Inventors: Jeff Roberts, San Jose, CA (US); Linda Wu, Sunnyvale, CA (US); Henry Nothhaft, Jr., Palo Alto, CA (US)

( * ) Notice: Subject to any disclaimer, the term of this patent is extended or adjusted under 35 U.S.C. 154(b) by 274 days.

This patent is subject to a terminal disclaimer.

(21) Appl. No.: 11/458,309

(22) Filed: Jul. 18, 2006

(65) Prior Publication Data

US 2008/0022369 A1 Jan. 24, 2008

(51) Int. Cl.
| | |
|---|---|
| G06F 7/04 | (2006.01) |
| G06F 12/00 | (2006.01) |
| G06F 12/14 | (2006.01) |
| G06F 13/00 | (2006.01) |
| G06F 17/30 | (2006.01) |
| G06F 7/00 | (2006.01) |
| G06F 15/16 | (2006.01) |
| G06F 15/173 | (2006.01) |

(52) U.S. Cl. .......... 726/17; 709/225; 709/229; 709/205; 709/204; 726/6

(58) Field of Classification Search .................... 726/17; 715/741, 511; 709/223, 225, 238, 205, 206
See application file for complete search history.

(56) References Cited

U.S. PATENT DOCUMENTS

| | | | | |
|---|---|---|---|---|
| 5,991,807 | A  * | 11/1999 | Schmidt et al. ............... | 709/225 |
| 6,976,078 | B1 * | 12/2005 | Icken et al. .................... | 709/229 |
| 7,092,821 | B2 * | 8/2006 | Mizrahi et al. .................... | 702/1 |
| 7,162,528 | B1 * | 1/2007 | Simonoff et al. ............. | 709/229 |
| 7,437,408 | B2 * | 10/2008 | Schwartz et al. ............. | 709/204 |
| 2002/0002586 | A1 * | 1/2002 | Rafal et al. ..................... | 709/205 |
| 2002/0124188 | A1 * | 9/2002 | Sherman et al. .............. | 713/201 |
| 2004/0215722 | A1 * | 10/2004 | Mukherjee .................... | 709/205 |
| 2005/0232423 | A1 * | 10/2005 | Horvitz et al. ................ | 380/255 |
| 2006/0117247 | A1 * | 6/2006 | Fite et al. ....................... | 715/511 |
| 2006/0129942 | A1 * | 6/2006 | McCary ......................... | 715/741 |
| 2006/0182249 | A1 * | 8/2006 | Archambault et al. .. | 379/202.01 |
| 2007/0106727 | A1 * | 5/2007 | Mainard ........................ | 709/205 |
| 2007/0150539 | A1 * | 6/2007 | O'Sullivan et al. ........... | 709/204 |

OTHER PUBLICATIONS

PCT Notification of Transmittal of the International Search Report and the Written Opinion of the International Searching Authority, or the Declaration, International Application No. PCT/US07/73801, International Filing Date Jul. 18, 2007, Date of Mailing: Jul. 15, 2008, 9 pages.

* cited by examiner

*Primary Examiner* — Shin-Hon Chen
(74) *Attorney, Agent, or Firm* — Cesari and McKenna, LLP

(57) ABSTRACT

In one embodiment, the methods and apparatuses select a primary group name; identify a first device associated with the primary group name wherein the first device is a member of the primary group name; specify a privilege associated with the member of the primary group name; and store the primary group name, the first device, and the privilege within a profile.

15 Claims, 6 Drawing Sheets

METHODS AND APPARATUSES FOR SELECTING PRIVILEGES FOR USE DURING A DATA COLLABORATION SESSION

FIELD OF INVENTION

The present invention relates generally to recording privileges and, more particularly, to utilizing network based recording privileges.

BACKGROUND

There are many settings that allow a user to locally configure the recording function on a device. In many cases, the user is capable of customizing the recording capabilities of this local device.

SUMMARY

In one embodiment, the methods and apparatuses select a primary group name; identify a first device associated with the primary group name wherein the first device is a member of the primary group name; specify a privilege associated with the member of the primary group name; and store the primary group name, the first device, and the privilege within a profile.

BRIEF DESCRIPTION OF THE DRAWINGS

The accompanying drawings, which are incorporated in and constitute a part of this specification, illustrate and explain one embodiment of the methods and apparatuses for selecting privileges for use during a data collaboration session.

In the drawings.

DETAILED DESCRIPTION

The following detailed description of the methods and apparatuses for selecting privileges for use during a data collaboration session refers to the accompanying drawings. The detailed description is not intended to limit the methods and apparatuses for selecting privileges for use during a data collaboration session. Instead, the scope of the methods and apparatuses for selecting privileges for use during a data collaboration session is defined by the appended claims and equivalents. Those skilled in the art will recognize that many other implementations are possible, consistent with the present invention.

References to a device include a desktop computer, a portable computer, a personal digital assistant, a video phone, a landline telephone, a cellular telephone, and a device capable of receiving/transmitting an electronic signal.

References to a data collaboration session include sharing data among multiple devices. The data may include audio, textual, and/or graphical information.

In one embodiment, the methods and apparatuses for selecting privileges for use during a data collaboration session selectively apply different privileges to be during a data collaboration session among multiple devices. The selection of a specific privilege depends on the specific devices, the specific groups, and the customization of the profile.

Figure 1:
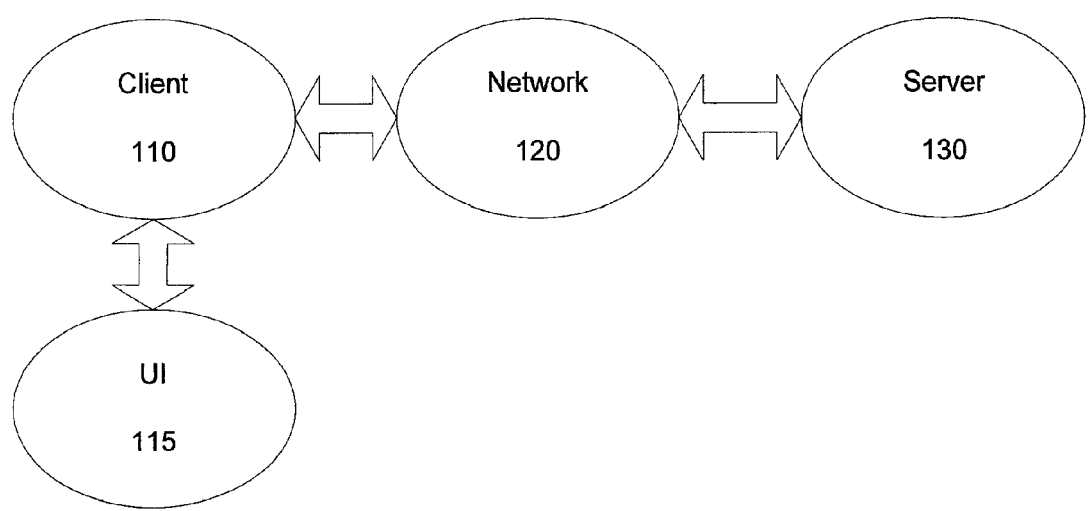
FIG. 1 is a diagram illustrating an environment within which the methods and apparatuses for selecting privileges for use during a data collaboration session are implemented.

FIG. 1 is a diagram illustrating an environment within which the methods and apparatuses for selecting privileges for use during a data collaboration session are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., keypad and video display screen input and output interfaces in the same housing such as a personal digital assistant. In other embodiments, one or more user interface 115 components (e.g., a keyboard, a pointing device such as a mouse, a trackball, etc.), a microphone, a speaker, a display, a camera are physically separate from, and are conventionally coupled to, electronic device 110. In one embodiment, the user utilizes interface 115 to access and control content and applications stored in electronic device 110, server 130, or a remote storage device (not shown) coupled via network 120.

In accordance with the invention, embodiments of selecting privileges for use during a data collaboration session below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
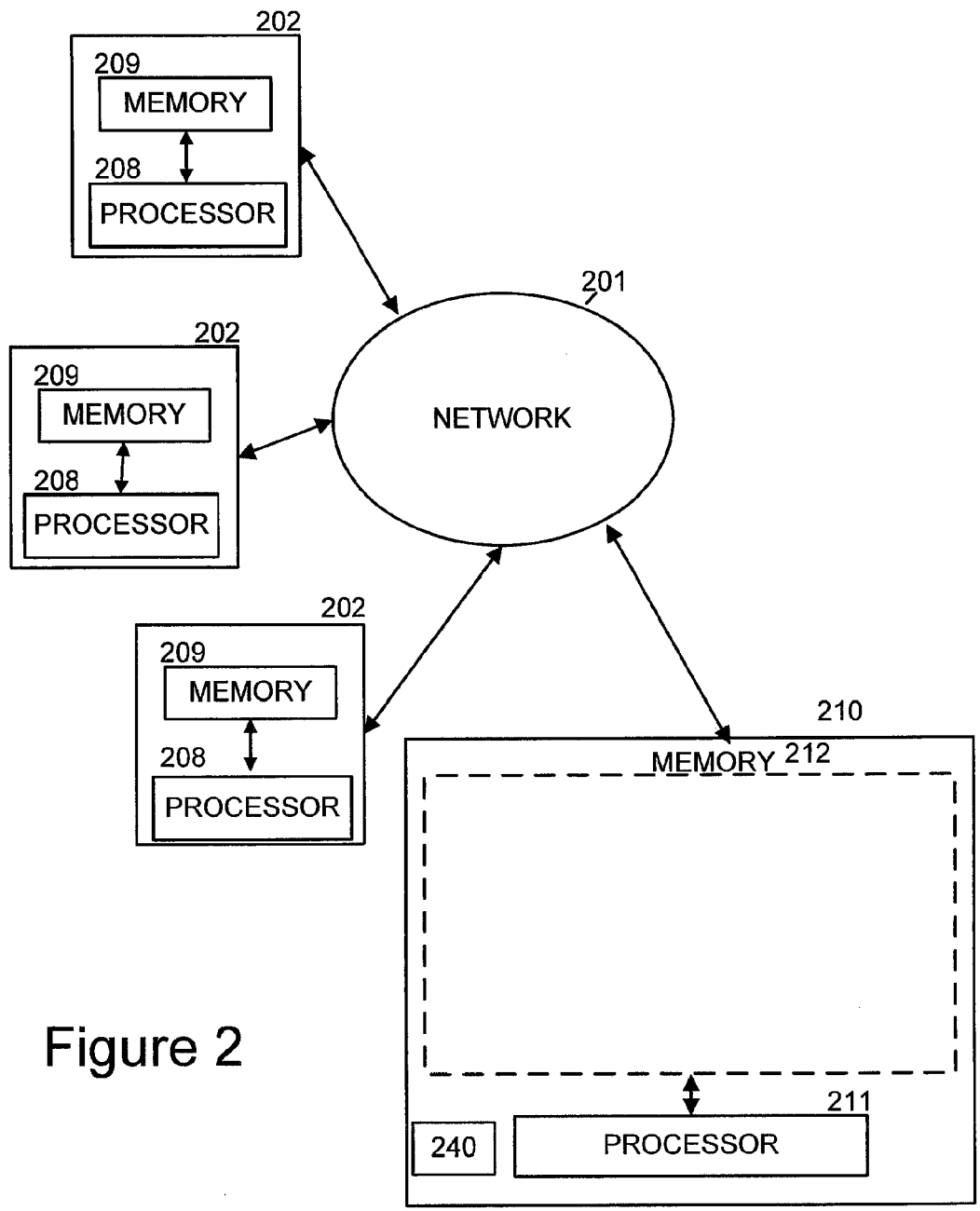
FIG. 2 is a simplified block diagram illustrating one embodiment in which the methods and apparatuses for selecting privileges for use during a data collaboration session are implemented.

FIG. 2 is a simplified diagram illustrating an exemplary architecture in which the methods and apparatuses for selecting privileges for use during a data collaboration session are implemented. The exemplary architecture includes a plurality of electronic devices 202, a server device 210, and a network 201 connecting electronic devices 202 to server 210 and each electronic device 202 to each other. The plurality of electronic devices 202 are each configured to include a computer-readable medium 209, such as random access memory, coupled to an electronic processor 208. Processor 208 executes program instructions stored in the computer-readable medium 209. In one embodiment, a unique user operates each electronic device 202 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

In one embodiment, the plurality of client devices 202 and the server 210 include instructions for a customized application for selecting privileges for use during a data collaboration session. In one embodiment, the plurality of computer-readable media 209 and 212 contain, in part, the customized application. Additionally, the plurality of client devices 202 and the server 210 are configured to receive and transmit electronic messages for use with the customized application. Similarly, the network 210 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on selecting privileges for use during a data collaboration session as determined using embodiments described below.

Figure 3:
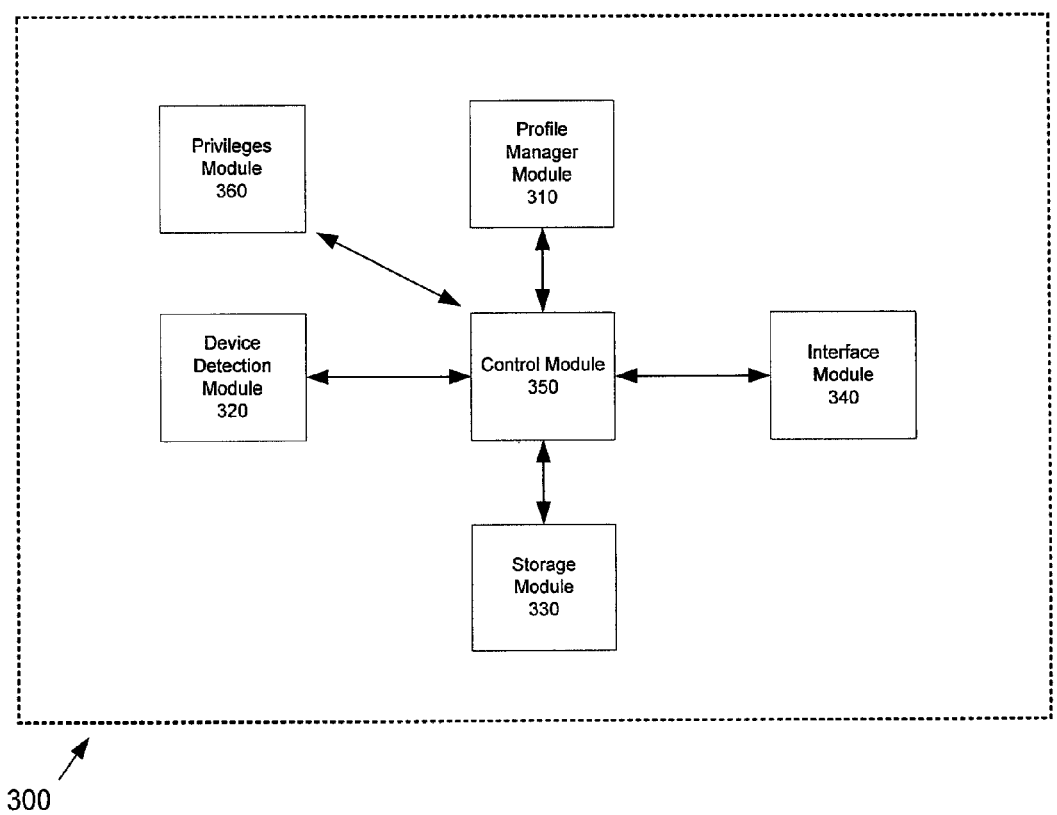
FIG. 3 is a simplified block diagram illustrating a system, consistent with one embodiment of the methods and apparatuses selectively controlling a remote device.

FIG. 3 illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes a profile manager module 310, a device detection module 320, a storage module 330, an interface module 340, a control module 350, and a privileges module 360.

In one embodiment, the control module 350 communicates with the profile manager module 310, the device detection module 320, the storage module 330, the interface module 340, the control module 350, and the privileges module 360. In one embodiment, the control module 350 coordinates tasks, requests, and communications between the profile manager module 310, the device detection module 320, the storage module 330, the interface module 340, the control module 350, and the privileges module 360.

In one embodiment, the profile manager module 310 organizes and tracks the profiles. In one embodiment, each profile corresponds to a device. In another embodiment, each profile corresponds to a group of devices.

In another embodiment, each profile corresponds to devices associated with a company.

In one embodiment, the device detection module 320 detects and identifies the identity of the device. In one embodiment, the device detection module 320 detects the identity of device through the Internet Protocol address associated with the device.

In one embodiment, the storage module 330 stores a record including a profile associated with the each device or group of devices. An exemplary profile is shown in a record 400 within FIG. 4.

In one embodiment, the interface module 340 detects the presence of a device through the network 120.

In one embodiment, the privileges module 360 is configured to organize the different configurations of collaboration privileges that are associated with a group of devices. In one embodiment, the group of devices is defined by a common association of these devices such as a company. Examples of specific privileges are shown in an exemplary record 400 and the following examples.

The system 300 in FIG. 3 is shown for exemplary purposes and is merely one embodiment of the methods and apparatuses for selecting privileges for use during a data collaboration session. Additional modules may be added to the system 300 without departing from the scope of the methods and apparatuses for selecting privileges for use during a data collaboration session. Similarly, modules may be combined or deleted without departing from the scope of the methods and apparatuses for selecting privileges for use during a data collaboration session.

Figure 4:
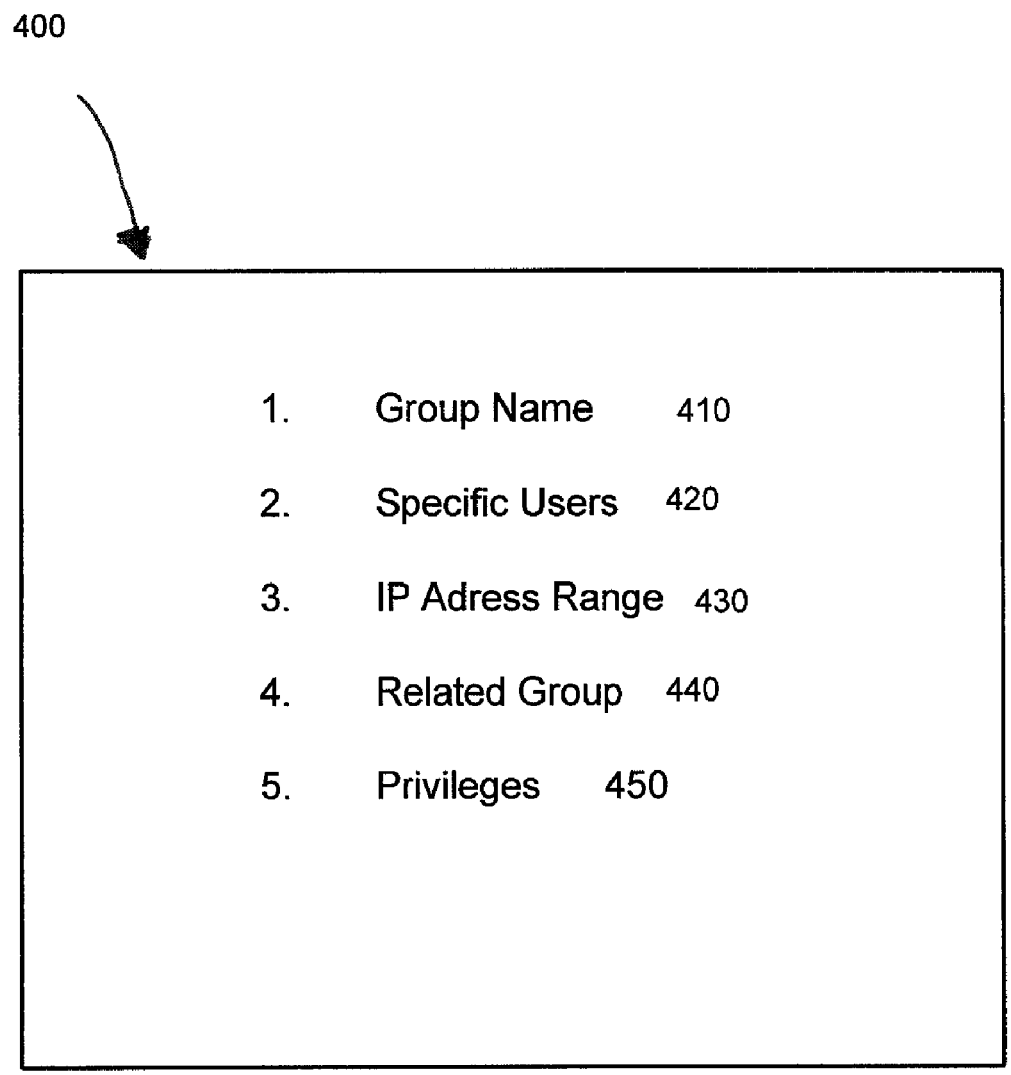
FIG. 4 is an exemplary record for use with the methods and apparatuses for selecting privileges for use during a data collaboration session.

FIG. 4 illustrates an exemplary record 400 for use with the methods and apparatuses for selecting privileges for use during a data collaboration session. In one embodiment, the record 400 illustrates an exemplary record associated with managing the different rules and privileges of transmitting data among multiple devices.

In one embodiment, there are multiple records such that each record 400 is associated with a particular group of devices. Further, each device may correspond with multiple records wherein each record 400 is associated with a particular profile associated with the device.

In one embodiment, the record 400 includes a group name field 410, a specific user field 420, an IP address range field 430, a related group field 440, and a privileges field 450. In one embodiment, the record 400 resides within the client 110. In another embodiment, the record 400 resides within the server 130.

In one embodiment, the group name field 410 includes information related to the identity of the group. For example, the group name field 410 may include a company name that includes the group of devices.

In one embodiment, the specific user field 420 includes a listing of devices that are associated with the specific group name from the group name field 410. For example, the listing of devices are associated with the particular group.

In one embodiment, the specific user field 420 includes information related to the identity of the device as the serial number associated with the device and/or the login identification for the user of the particular device. For example, each device has a unique serial number identifying this particular device. Further, the login identification for an approved user also identifies that the user of the device is authorized to be included within the group identified by the group name field 410.

In one embodiment, the IP address range field 430 identifies the range of IP addresses that are recognized to be utilized by devices within the group as identified by the group name field 410. In one embodiment, specific IP address ranges are utilized by a company. Further, by logging onto a corporate intranet, an authorized device may also utilize an IP address within the prescribed range even though a user of the device may utilize DSL or a remote telephone line to access the Internet.

In one embodiment, the related group field 440 allows devices associated with a different group than the group identified within the group name field 410 to be recognized. In one embodiment, the devices associated with the group identified within the related group field 440 are also identified by information contained within the group name field 410, the specific user field 420, and the IP address range field 430.

In one embodiment, the privileges field 450 identifies different privileges for a data collaboration session between multiple devices. For example, the privileges may restrict the ability of certain devices to record, copy, view, and/or access data shared during the data collaboration session.

Figure 5:
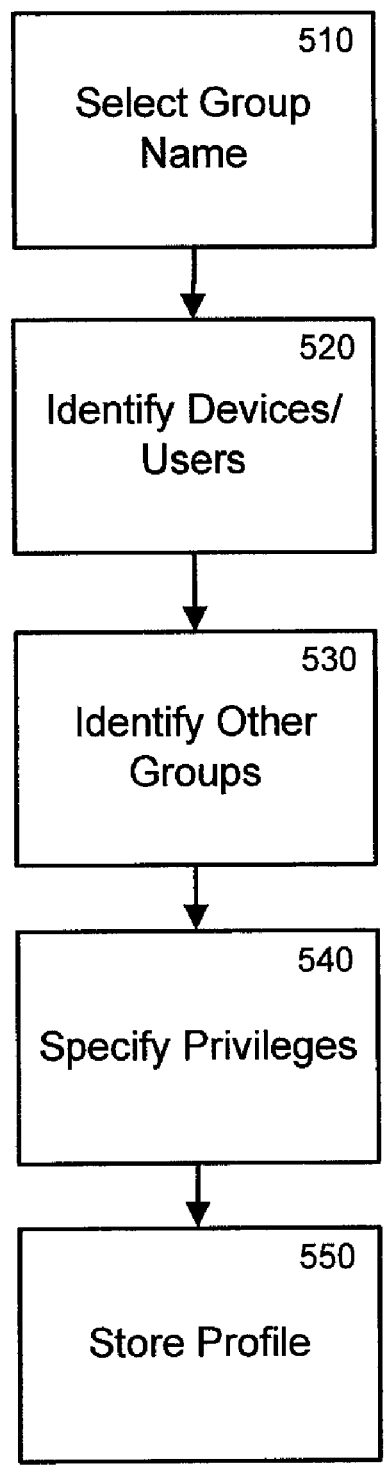
FIG. 5 is a flow diagram consistent with one embodiment of the methods and apparatuses for selecting privileges for use during a data collaboration session.
Figure 6:
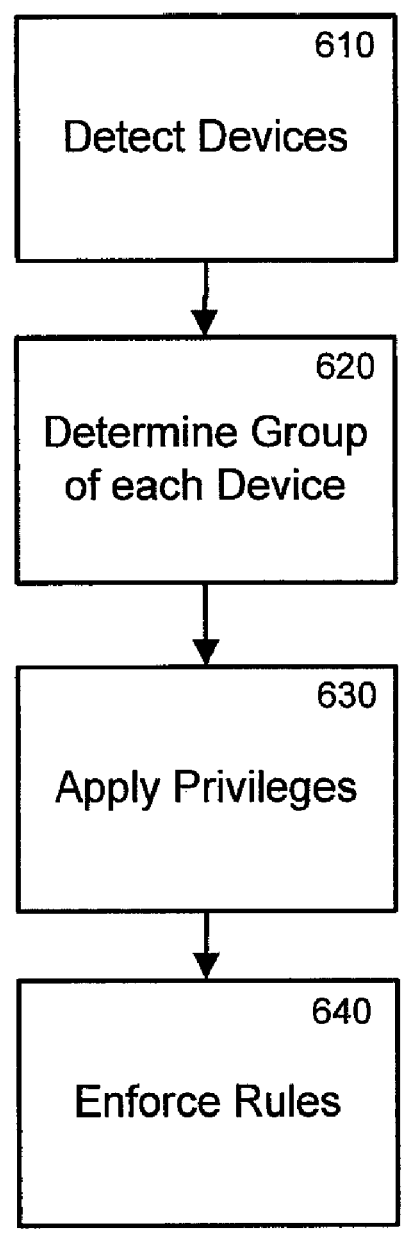
FIG. 6 is a flow diagram consistent with one embodiment of the methods and apparatuses for selecting privileges for use during a data collaboration session.

The flow diagrams as depicted in FIGS. 5 and 6 are one embodiment of the methods and apparatuses for selecting privileges for use during a data collaboration session. The blocks within the flow diagrams can be performed in a different sequence without departing from the spirit of the methods and apparatuses for selecting privileges for use during a data collaboration session. Further, blocks can be deleted, added, or combined without departing from the spirit of the methods and apparatuses for selecting privileges for use during a data collaboration session.

The flow diagram in FIG. 5 illustrates customizing an exemplary record for transmission of data during a data collaboration session according to one embodiment of the invention.

In Block 510, a group name is selected. In one embodiment, the group name is associated with a specific company.

In Block 520, devices and users that are associated with the specific company are identified. In one embodiment, the device serial number may be utilized to identify specific devices. In another embodiment, the IP address ranges and/or login identifications may be utilized to identify specific users. In one embodiment, any number of users and/or devices may be associated with the specific company.

In Block 530, other groups are identified. In one embodiment, other companies and their associated users are identified.

In Block 540, specific privileges are selected between various users and/or devices. In one instance, exemplary privileges include limiting the data shared during the data collaboration session, limiting the transmission of documents from one device to another, limiting the recording of the data collaboration session, and the like.

Further, the specific privileges can be configured differently depending on the company associated with each device or user. For example, users/devices from company A may have liberal privileges during a data collaboration session among themselves. However, the users/devices from company A may have restricted privileges when collaborating with users from company B or an unknown company.

In Block 550, the profile for the specific company including the associated users/devices, associated companies, and specific privileges are stored with a storage module 330.

The flow diagram in FIG. 6 illustrates limiting transmission of data during a data collaboration session according to one embodiment of the invention.

In Block 610, a device is detected. In one embodiment, the device is identified through a login identification that uniquely identifies that device. In another embodiment, the login identification uniquely identifies the particular user.

In another embodiment, the device is identified through the IP address that is utilized by the device.

In Block 620, the devices detected within the Block 610 are categorized into groups. Some exemplary groups include Company A, Company B, and undetermined. For example, if the device's IP address range or login identification is recognized as being included within the attributes of Company A, then this particular device is categorized as associated with Company A. Similarly, if the device's IP address range or login identification is not recognized as being included within the attributes of a group, then the device would be categorized and undetermined.

In Block 630, privileges and limitations are identified. In one embodiment, exemplary privileges and limitations include transmission of data, recording the data collaboration session, and receipt of data.

In Block 640, the privileges and limitations are selectively applied to each device based on the categorization of the devices and the application rules of each privilege and limitation.

In an exemplary scenario A, a data collaboration session is hosted by participant A and attended by participant B. In this scenario, both participants A and B are identified as belonging to company A. In one embodiment, the participants A and B are associated with company A through the device utilized by each of the participants A and B. The devices may be associated with company A through an IP address range, a serial number, and the like. In another embodiment, the participants may be identified through a login identification that associates each participant with company A. In one embodiment, when participants A and B are both associated with company A, the restrictions of sharing data and recording the data collaboration session may be minimized to allow maximum access and recording.

In another scenario B, a data collaboration session is hosted by participant A and attended by participants B and C. In this scenario, both participants A and B are identified as belonging to company A; and participant C is identified as belonging to company B. In one embodiment, the participants are associated with a specific company through the device utilized by each of the participants. The devices may be associated with the specific company through an IP address range, a serial number, and the like. In another embodiment, the participants may be identified through a login identification that associates each participant with a specific company. In one embodiment, when participants A and B are both associated with company A, the restrictions of sharing data and recording the data collaboration session between participants A and B may be minimized to allow maximum access and recording. However, restrictions may be placed on data flowing between participants A and B and participant C. For example, data flowing from participants A and B to participant C may be restricted. Further, participant C may be prevented from recording the data collaboration session.

In one embodiment, participant C is subject to the limitations and restrictions imposed by company A. Further, the limitations and restrictions imposed by company A are represented by an exemplary record 400 in one embodiment.

In another embodiment within the scenario B, data flowing from participant C to participants A and B may be restricted. Further, participants A and B may be prevented from recording the data collaboration session. Participants A and B are subject to the limitations and restrictions imposed by company B. Further, the limitations and restrictions imposed by company B are represented by an exemplary record 400 in one embodiment.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method comprising:
   selecting a primary group name;
   identifying a first device that is a member of a primary group associated with the primary group name;
   specifying privileges associated with the member of the primary group, wherein the privileges limit transmission of documents from the first device to one or more other devices that are non-members of the primary group during a data collaboration session, and at least one of limit a quantity of other data transmitted from the first device to one or more other devices that are non-members of the primary group during the data collaboration session, limit a type of other data transmitted from the first device to one or more other devices that are non-members of the primary group during the data collaboration session, or limit recording the data collaboration session by one or more other devices that are the non-members of the primary group;

storing the primary group name, an identification of the first device, the privileges, and an Internet Protocol (IP) address range associated with the primary group name within a profile; and establishing the data collaboration session between the first device and the one or more other devices to share data among users of the devices, wherein the data collaboration session restricts the first device from transmitting documents to a second device during the data collaboration session, and at least one of restricts the quantity of other data transmitted to the second device during the data collaboration session, restricts the type of other data transmitted to the second device during the data collaboration session, or restrict recording the data collaboration session by the second device according to the privileges, based on the second device's IP address not falling within the IP address range associated with the primary group name stored within the profile and thereby being considered a non-member of the primary group.

2. The method according to claim 1 further comprising identifying a user associated with the primary group.

3. The method according to claim 2 wherein identifying the user associated with the primary group further comprises specifying a login identification.

4. The method according to claim 1 wherein identifying the first device further comprises specifying a device serial number.

5. The method according to claim 1 wherein identifying the first device further comprises specifying that the first device's IP address falls within the IP address range associated with the primary group name.

6. The method according to claim 1 wherein the second device is a member of an alternate group associated with an alternate group name.

7. The method according to claim 6 wherein the privileges corresponds to other devices associated with the alternate group.

8. The method of claim 1, wherein the first device is one of a desktop computer, a portable computer, a personal digital assistant, a video phone, and a cellular telephone.

9. The method of claim 1, wherein the data includes audio, textual, or graphical information.

10. The method of claim 1, further comprising: performing a task by the first device during the data collaboration session, wherein the task is one of recording, copying, viewing, and accessing the data during the data collaboration session.

11. A method comprising:
selecting a primary group name;
identifying a first user that is a member of a primary group associated with the primary group name;
specifying privileges associated with the member of the primary group, wherein the privileges limit transmission of documents from the first user to one or more other users that are non-members of the primary group during a data collaboration session, and at least one of limit a quantity of other data transmitted from the first user to one or more other users that are non-members of the primary group during the data collaboration session, limit a type of other data transmitted from the first user to one or more other users that are non-members of the primary group during the data collaboration session, or limit recording the data collaboration session by one or more other users that are the non-members of the primary group;

storing the primary group name, an identification of the first user, the privileges, and an Internet Protocol (IP) address range associated with the primary group name within a profile; and establishing the data collaboration session between the first user and one or more other users to share data among users, wherein the data collaboration session restricts the first user from transmitting documents to a second user during the data collaboration session, and at least one of restricts the quantity of other data transmitted to the second user during the data collaboration session, restricts the type of other data transmitted to the second user during the data collaboration session, or restrict recording the data collaboration session by the second user according to the privileges, based on an IP address associated with the second user not falling within the IP address range associated with the primary group name stored within the profile and thereby being considered a non-member of the primary group.

12. The method according to claim 11 wherein identifying the first user further comprises identifying a login identification.

13. The method according to claim 11 wherein the second user is associated with an alternate group name.

14. The method according to claim 13 wherein the privileges corresponds to other users associated with the alternate group name.

15. A system comprising:
means for selecting a primary group name;
means for identifying a first device that is a member of a primary group associated with the primary group name;
means for specifying a-privileges associated with the member of the primary group, wherein the privileges limit transmission of documents from the first device to one or more other devices that are not members of the primary group during a data collaboration session, and at least one of limit a quantity of other data transmitted from the first device to one or more other devices that are non-members of the primary group during the data collaboration session, limit a type of other data transmitted from the first device to one or more other devices that are non-members of the primary group during the data collaboration session, or limit recording the data collaboration session by one or more other devices that are the non-members of the primary group;

means for storing the primary group name, an identification of the first device, the privileges, and an Internet Protocol (IP) address range associated with the primary group name within a profile; and means for establishing the data collaboration session between the first device and one or more other devices to share data among users of the devices, wherein the data collaboration session restricts the first device from transmitting documents to a second device during the data collaboration session, and at least one of restricts the quantity of other data transmitted to the second device during the data collaboration session, restricts the type of other data transmitted to the second device during the data collaboration session, or restrict recording the data collaboration session by the second device, based on the second device's IP address not falling within the IP address range associated with the primary group name stored within the profile and thereby being considered a non-member of the primary group.

* * * * *